Oct. 1, 1946.  R. A. YOUNG  2,408,503
PIN CLUTCH ARBOR
Filed May 24, 1944
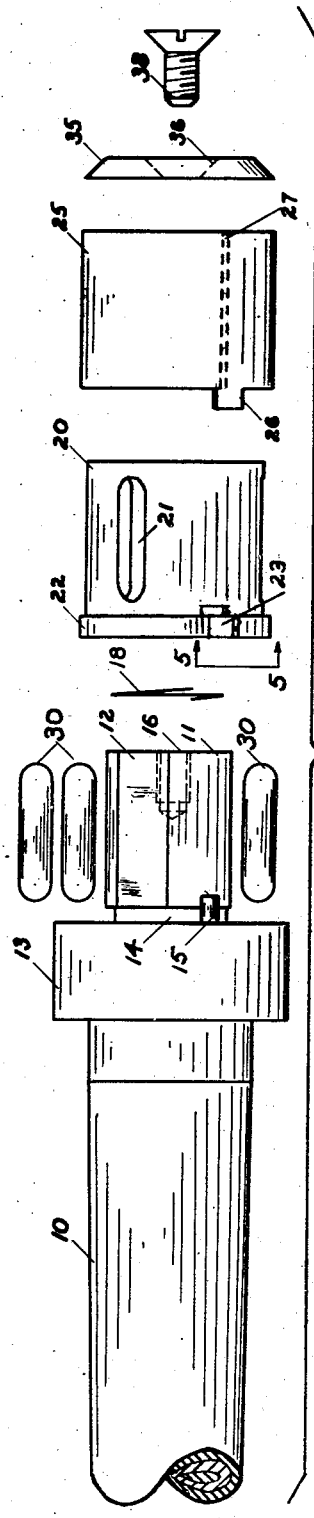
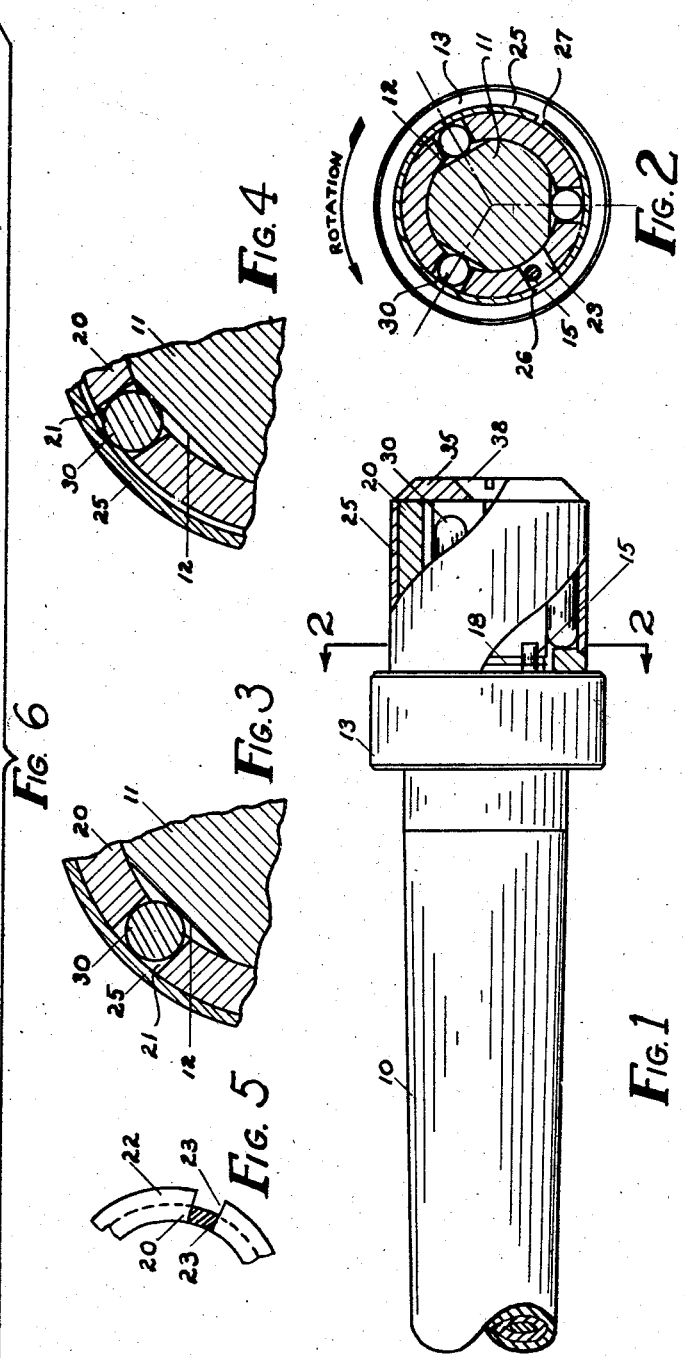
INVENTOR.
Ray Alden Young
BY
Morton S. Brockman Patented Oct. 1, 1946

2,408,503

UNITED STATES PATENT OFFICE 2,408,503

PIN CLUTCH ARBOR

Ray Alden Young, Willoughby, Ohio

Application May 24, 1944, Serial No. 537,151

3 Claims. (Cl. 279—2)

This invention relates to arbors, mandrels and similar tools.

The primary object of the invention is to provide a device of the type named which will quickly and easily engage and firmly retain an object to be rotated or machined.

Another object is to provide a simple holder that is relatively inexpensive to manufacture and assemble and which is relatively simple and easy to use by inexperienced persons.

A further object is to provide a device which grips or engages the work uniformly around an inside surface and which does not change the axis around which it rotates regardless of whether it is closed or open.

These and other objects will become apparent from a reading of the following specification and claims in connection with the accompanying drawing in which like parts are referred to and indicated by like reference characters and wherein:

Figure 1 is a side elevation, with parts broken away, of an arbor embodying this invention;

Figure 2 is a vertical cross sectional view of the arbor taken along the line and in the direction of the arrows 2—2 of the Figure 1;

Figure 3 is an enlarged sectional view of a part of the arbor showing the relationship of the parts when the clutch is closed;

Figure 4 is a view similar to that of Figure 3 but showing the clutch open;

Figure 5 is a view of a part of the device taken along the line and in the direction of the arrows 5—5 of the Figure 6; and Figure 6 is an exploded view of the arbor.

Referring to the drawing, there is shown an arbor having a body portion, a cage member, roller members, a split sleeve, a means for retaining these elements in assembled relation and a means for limiting the movement of certain parts thereof. Each of these parts and means will be described in detail and in the order just set forth.

The body portion of the arbor consists of a tapered shank 10, a somewhat thickened portion referred to and indicated as the collar 13, and a head portion 11. The portion of the body between the collar 13 and the head 11 is somewhat constricted and is referred to as the neck 14. The head member 11 is cylindrical in shape and has three chordal flat surfaces 12 evenly spaced therearound. The head member 11 also has a small longitudinally extending hole 16 therein which is threaded to receive the screw 38 hereinafter referred to. The collar 13 has a small pin 15 projecting outwardly therefrom adjacent to the head and neck members 11 and 14. The tapered shank 10 is designed to fit into a regular collet chuck.

The cage member 20 is a tubular element which has three large slots or openings 21 therein, which are parallel to each other and evenly spaced around its side. One end of the cage member 20 is provided with a peripheral flange 22. A small slot 23 is cut into the cage member 20 and the flange 22 as shown in the Figures 5 and 6.

The expansible sleeve member is a tubular element 25 which has a longitudinal slit 27 therein which permits it to expand or contract as desired. One of its edges has a small tongue 26 projecting therefrom as shown in the Figure 6.

The roller members may be ball or cylinder bearings 30 which fit in the opening 21 of the cage member and which have outside diameters slightly larger than the thickness of the cage member itself.

When assembled, the cage member fits over the head portion 11, with the flange 22 adjacent to the neck portion 14 and so that the pin 15 rests in the slot 23 in line with the tubular portion 20 of the cage member. A small spiral spring 18 is also mounted around the neck portion 14 with one end thereof engaging the pin 15 and the other end engaging the slot 23 of the cage member. This spring 18 has a tendency therefore to keep the pin 15 toward one side of the slot 23 as indicated in the Figure 2.

The pins or bearings 30 are then placed in the openings 21 of the cage member and the split sleeve 25 is then placed over the cage, roller and head members, with the tab 26 fitting in the portion of the slot 23 that is aligned with the flange 22, as shown in the Figure 2. The aforesaid members are then retained in position and in the assembled condition by the washer 35 and the screw 38 which passes through the hole 36 of the washer and firmly engages the threaded hole 16 of the head member.

When used, the work to be finished is placed over the split sleeve 25 when it is in the contracted position or the position shown in the Figure 3. The body portion of the arbor is then turned in the direction opposite to that in which the work is to rotate, and the rollers 30 are then caused to move on the flat surfaces 12 of the head member and toward the rounded surfaces thereof. When this occurs, the pins rise and expand the split sleeve 25 so that its outer surface tightly contacts and grips the work placed therearound. The Figure 4 clearly shows the expanded condition of the arbor and the relative position of the parts when gripping or engaging certain work.

Having thus described this invention in its preferred form, it is to be understood that the embodiment thereof as illustrated is not to be considered in a limiting or restricted sense as there may be many other forms or modifications of the invention which may also be considered to come within the scope of the appended claims.

I claim:

1. In a clutch type arbor of the type including a shoulder, a head attached thereto and a cage having a notch therein mounted thereon, a stop means, comprising, a pin mounted on the shoulder adjacent to the head and engageable with the cage in a manner limiting the rotation thereof, and an expansible sleeve mounted on the cage and having a tab thereon engageable with the aforesaid notch adjacent to the said pin.

2. In a clutch type arbor of the type including a shoulder, a head attached thereto and a cage having a notch therein mounted thereon, a stop means, comprising, a pin mounted on the shoulder adjacent to the head and engageable with the cage in a manner limiting the rotation thereof, an expansible sleeve mounted on the cage and having a tab thereon engageable with the aforesaid notch adjacent to the said pin, and a spring mounted inside the sleeve and engaging the said pin and the aforesaid cage.

3. A clutch type arbor, comprising in combination, a body member including a collar portion and a head portion, the said collar portion having a pin thereon contiguous to the head portion, a rotatable cage member surrounding the head member and including a roller member engageable with the head portion, the said cage member having a notch therein receiving the pin and restricting rotation on the head member.

RAY ALDEN YOUNG.